US010145369B2

(12) United States Patent
Häfele et al.

(10) Patent No.: US 10,145,369 B2
(45) Date of Patent: Dec. 4, 2018

(54) POWER SUPPLY UNIT, COMBINATION OF A POWER SUPPLY UNIT OF THIS KIND WITH A FURTHER FUNCTIONAL UNIT, AND HEAVY ROAD VEHICLE

(71) Applicant: Goldhofer AG, Memmingen (DE)

(72) Inventors: Horst Häfele, Babenhausen (DE); Gabor Pfarr, Ulm (DE)

(73) Assignee: Goldhofer AG, Memmingen (DE)

( * ) Notice: Subject to any disclaimer, the term of this patent is extended or adjusted under 35 U.S.C. 154(b) by 0 days.

(21) Appl. No.: 15/567,635

(22) PCT Filed: Apr. 22, 2016

(86) PCT No.: PCT/EP2016/059033
§ 371 (c)(1),
(2) Date: Oct. 19, 2017

(87) PCT Pub. No.: WO2016/170125
PCT Pub. Date: Oct. 27, 2016

(65) Prior Publication Data
US 2018/0149146 A1 May 31, 2018

(30) Foreign Application Priority Data
Apr. 23, 2015 (DE) .................. 10 2015 207 427

(51) Int. Cl.
| | |
|---|---|
| *B60K 1/00* | (2006.01) |
| *F04B 17/03* | (2006.01) |
| *B60K 8/00* | (2006.01) |
| *H01M 10/613* | (2014.01) |
| *B62D 3/14* | (2006.01) |
| *F04B 17/05* | (2006.01) |

(Continued)

(52) U.S. Cl.
CPC ............... *F04B 17/03* (2013.01); *B60K 1/00* (2013.01); *B60K 8/00* (2013.01); *B62D 3/14* (2013.01);
(Continued)

(58) Field of Classification Search
CPC .. F04B 17/03; F04B 17/05; F04B 2203/0405; H01M 10/613; B62D 3/14; H02K 9/19;
(Continued)

(56) References Cited

U.S. PATENT DOCUMENTS 3,913,697 A * 10/1975 Greene ............... B60K 17/356 180/14.3
5,794,422 A * 8/1998 Reimers .................. A01D 34/58 56/11.9

(Continued)

FOREIGN PATENT DOCUMENTS

| | | |
|---|---|---|
| DE | 202013004211 | 6/2013 |
| EP | 0947376 | 10/1999 |

(Continued)

OTHER PUBLICATIONS

International Search Report filed in PCT/EP2016/059033 dated Apr. 8, 2016.
(Continued)

*Primary Examiner* — Jacob B Meyer
(74) *Attorney, Agent, or Firm* — Rankin, Hill & Clark LLP (57) ABSTRACT

A power supply unit, which supplies hydraulic drive motors of a heavy goods vehicle with hydraulic fluid, includes a frame with first connecting elements for operationally fixed mechanical connection to the heavy goods vehicle and second connecting elements for operationally fixed mechanical connection to a further functional unit, a hydraulic pump, which is attached to the frame, can be driven by an assigned electric motor and during operation feeds hydraulic fluid to drive the hydraulic drive motors, and a battery pack, which is attached to the frame and supplies the electric motor with electrical drive power. The hydraulic pump and electric motor are configured in such a way that
(Continued)

the hydraulic pump can be operated as a hydraulic motor and the electric motor can be operated as an electric generator.

15 Claims, 4 Drawing Sheets

(51) Int. Cl.
  *H02K 7/18* (2006.01)
  *H02K 9/19* (2006.01)
  *B60K 1/04* (2006.01)
(52) U.S. Cl.
  CPC ........... *F04B 17/05* (2013.01); *H01M 10/613* (2015.04); *H02K 7/18* (2013.01); *H02K 9/19* (2013.01); *B60K 2001/0444* (2013.01); *F04B 2203/0405* (2013.01)
(58) Field of Classification Search
  CPC ... H02K 7/18; B60K 1/00; B60K 8/00; B60K 2001/0444
  See application file for complete search history.

(56) References Cited

U.S. PATENT DOCUMENTS

| | | | | |
|---|---|---|---|---|
| 8,191,342 | B2 * | 6/2012 | Ishii | A01D 34/44 56/11.9 |
| 8,490,722 | B2 * | 7/2013 | Koga | B62D 11/003 180/6.28 |
| 8,639,404 | B2 * | 1/2014 | Sugiyama | B60K 6/12 701/22 |
| 9,108,516 | B2 * | 8/2015 | Sugiyama | B60K 6/12 |
| 9,790,662 | B2 * | 10/2017 | Ota | E02F 9/123 |
| 2008/0264026 | A1 * | 10/2008 | Ishii | A01D 34/44 56/10.8 |
| 2011/0127093 | A1 * | 6/2011 | Koga | B62D 11/003 180/6.24 |
| 2012/0130576 | A1 * | 5/2012 | Sugiyama | B60K 6/12 701/22 |
| 2014/0107881 | A1 * | 4/2014 | Sugiyama | B60K 6/12 701/22 |
| 2018/0149146 | A1 * | 5/2018 | Hafele | B60K 1/00 |

FOREIGN PATENT DOCUMENTS

| | | |
|---|---|---|
| EP | 2394835 | 12/2011 |
| WO | 00/27662 | 5/2000 |
| WO | 2011/108948 | 9/2011 |
| WO | 2015/010285 | 1/2015 |

OTHER PUBLICATIONS

German Search Report filed in DE 10 2015 207 427.7 dated Jan. 7, 2016.

\* cited by examiner

POWER SUPPLY UNIT, COMBINATION OF A POWER SUPPLY UNIT OF THIS KIND WITH A FURTHER FUNCTIONAL UNIT, AND HEAVY ROAD VEHICLE

The invention relates to a power supply unit that is designed and intended for supplying at least one hydraulic drive motor of a heavy road vehicle with hydraulic fluid via a drive hydraulic line system of the heavy road vehicle.

Conventionally, a hydraulic pump that conveys hydraulic fluid to the at least one hydraulic drive motor of a heavy road vehicle is driven by means of a diesel motor. However, as is typical for an internal combustion engine, exhaust gases are generated in the process. This is undesirable in particular when operating the heavy road vehicle in enclosed spaces, and may even be detrimental to the health of people in the space.

Heavy road vehicles that are operated purely electrically are also known, but have some disadvantages compared with heavy road vehicles operated by a diesel motor, which disadvantages greatly restrict the possible applications of said vehicles. Said disadvantages include, for example, short operating times between two charging processes, long charging times, and the like.

The object of the present invention is therefore that of providing a power supply unit for a heavy road vehicle that has improved application possibilities.

According to a first aspect, this object is achieved according to the invention by a power supply unit that is designed and intended for supplying at least one hydraulic drive motor of a heavy road vehicle with hydraulic fluid via a drive hydraulic line system of the heavy road vehicle, said power supply unit comprising a frame having first connection elements that are designed and intended to cooperate with first mating connection elements of the heavy road vehicle in order to mechanically rigidly connect the power supply unit to the heavy road vehicle in an operational manner, and having second connection elements that are designed and intended to cooperate with second mating connection elements of a further functional unit in order to mechanically rigidly connect the power supply unit to the further functional unit in an operational manner, a hydraulic pump that is fastened to the frame, can be driven by an associated electric motor and is designed and intended for conveying hydraulic fluid to the drive hydraulic line system of the heavy road vehicle during operation, and a battery pack that is fastened to the frame and is designed and intended for supplying electrical drive energy to the electric motor, the hydraulic pump and the electric motor being designed such that the hydraulic pump can be operated as a hydraulic motor and the electric motor can be operated as an electric generator.

The power supply unit according to the invention thus has the advantage that the battery pack can be charged, using the hydraulic pump as a hydraulic motor and the electric motor as an electric generator, while the heavy road vehicle is driven by another power source, e.g. a diesel motor. This can significantly increase the operating period of the heavy road vehicle.

The further advantage, specifically the modular structure of the drive arrangement for a heavy road vehicle that is made possible by the power supply unit according to the invention, will be explained in greater detail in the following when the combination of the power supply unit according to the invention with the further functional unit is discussed.

Advantageously, the hydraulic pump can comprise a hydraulic connection, by means of which said pump can be fluidically connected to a hydraulic fluid reservoir arranged on the further functional unit. Amounts of hydraulic fluid that have been lost from the drive hydraulic line system, for example due to possible leakages, can be fed from the hydraulic fluid reservoir arranged on the further functional unit via this fluid connection. The power supply unit itself therefore does not need a hydraulic fluid reservoir, but instead the hydraulic fluid reservoir that is in any case present on the further functional unit can be used for this purpose. This simplifies the structure of the power supply unit according to the invention and thus reduces the production costs thereof.

Advantageously, the power supply unit according to the invention can further comprise a tank for coolant for cooling the electric motor and/or a cooler for cooling the coolant for cooling the electric motor. The coolant can be oil for example, which can be supplied to and removed from the electric motor in the form of oil cooling in a closed cooling circuit. The heat absorbed by the coolant can be emitted to the surroundings by means of the cooler.

The power supply unit can further comprise a tank for coolant for cooling the battery pack and/or a cooler for cooling the coolant for cooling the battery pack. The coolant for cooling the battery pack can be water for example, which can be supplied to and removed from the battery pack in the form of water cooling. The heat absorbed by the coolant can be emitted to the surroundings by means of the cooler.

In order to be able to make as many as possible of the functions required for operating the heavy road vehicle available to the power supply unit according to the invention during purely electrical operation, in a development of the invention said power supply unit can further comprise a second hydraulic pump that can preferably also be driven by the electric motor and that is designed and intended for conveying hydraulic fluid to a steering system and/or to a lifting system of the heavy road vehicle. The hydraulic line system leading to the steering system and/or the lifting system is also referred to in the following as the "working hydraulic line system".

The second hydraulic pump can comprise a hydraulic connection by means of which said pump can be fluidically connected to a hydraulic fluid reservoir arranged on the further functional unit. Amounts of hydraulic fluid that have been lost from the working hydraulic line system, for example due to possible leakages, can be replaced from the hydraulic fluid reservoir arranged on the further functional unit via this fluid connection. The power supply unit itself therefore does not need a hydraulic fluid reservoir, but instead the hydraulic fluid reservoir that is in any case present on the further functional unit can be used for this purpose. This simplifies the structure of the power supply unit according to the invention and thus reduces the production costs thereof.

It is thus possible for the two hydraulic pumps to be able to be connected, in a structurally simple manner, to the same hydraulic fluid reservoir arranged on the further functional unit.

Advantageously, the power supply unit can further comprise a compressor that is designed and intended for providing compressed air for a braking system of the heavy road vehicle. The braking system can be supplied with compressed air directly from the compressor or from a compressed air tank that is preferably arranged on the heavy road vehicle. If the pressure in the compressed air tank drops too sharply, said tank can thus be filled again by means of the compressor. The compressor can also be driven by the electric motor for example. Alternatively, however, it is also conceivable to drive the compressor by means of a further electric motor or a hydraulic motor. In the latter variant, the compressor need only be driven if required.

As already mentioned, according to a second aspect, the invention relates to a combination of a power supply unit according to the invention with a further functional unit that comprises at least one hydraulic fluid reservoir.

The further functional unit can for example also be a power supply unit, for example a power supply unit as marketed by the applicant under the designation "power pack" for its self-driving modular heavy road vehicles. The further functional unit can thus comprise an internal combustion engine for example, in particular a diesel motor, and a third hydraulic pump, the internal combustion engine being connected to the third hydraulic pump so as to drive said pump, and the third hydraulic pump being designed and intended for conveying hydraulic fluid to the drive hydraulic line system of the heavy road vehicle, and specifically optionally by flowing through the one hydraulic pump that operates as the hydraulic motor. In principle, it is also conceivable to operate the internal combustion engine only in order to charge the battery pack, in this case the hydraulic fluid being supplied only to the one hydraulic pump that operates as the hydraulic motor, but not to the drive hydraulic line system of the heavy road vehicle.

The power supply unit according to the invention thus provides the advantage of supplementing the modular design of the applicant's self-driving heavy road vehicle. If an operator wishes to operate the heavy road vehicle not only by means of the internal combustion engine but also by means of an electric motor, said operator thus need only interpose the power supply unit according to the invention between the heavy road vehicle and the "power pack" that is already provided. In order to make it possible to change between the two operating modes, a selector switch can be provided on a user interface for example. In this case, the selector switch can advantageously be arranged on the power supply unit according to the invention, since it is the power supply unit that makes the additional, battery-operated operating mode possible.

In operation using the internal combustion engine, in order to provide a charging current for the battery pack of the power supply unit according to the invention, the hydraulic pump can be used as a hydraulic motor that is driven by the hydraulic fluid conveyed by the third hydraulic pump and that drives the electric motor operating as an electric generator. The heavy road vehicle thus does not need to be taken out of service for separate charging cycles. The useful operating period of the heavy road vehicle can thus be increased significantly.

The power supply unit according to the invention can further comprise a controlled valve which, when the battery pack is fully charged, shuts off the one hydraulic pump and supplies the hydraulic fluid conveyed by the third hydraulic pump purely to the drive hydraulic line system of the heavy road vehicle. It is thus possible to prevent unnecessary power expenditure that results from driving the hydraulic pump that operates as a hydraulic motor, without it being possible for the battery pack to be charged further.

As an alternative or in addition to the selector switch between the battery-operated and fuel-operated drive mode, the controller can advantageously change automatically from the battery-operated drive mode to the fuel-operated drive mode if there is no longer sufficient power available for driving the heavy road vehicle. Of course, it is also conceivable for the controller to be able to switch automatically from the fuel-operated drive mode to the battery-operated drive mode if there is no longer sufficient fuel available.

Analogously to the second hydraulic pump that is preferably also assigned to the electric motor of the power supply unit, the further functional unit can comprise a fourth hydraulic pump that is preferably likewise assigned to the internal combustion engine and that is designed and intended for conveying hydraulic fluid to a steering system and/or a lifting system of the heavy road vehicle. Moreover, the further functional unit can comprise a second compressor that is preferably also assigned to the internal combustion engine and that is designed and intended for providing compressed air for a braking system of the heavy road vehicle.

In a development of the invention, the further functional unit can comprise a controller and/or a user interface. The heavy road vehicle can thus be operated directly on the further functional unit or optionally also via a corresponding remote-control. In this case, the controller is used for manually or automatically controlling the components of the heavy road vehicle.

In the event that the heavy road vehicle is intended to be operated purely electrically, the further functional unit can comprise just the hydraulic fluid reservoir and, if desired, the controller and/or the user interface. Since the further functional unit does not comprise an internal combustion engine in this case, the components of said unit can be arranged in a correspondingly compact frame. In this case, the combination of the power supply unit and the further functional unit can thus be of a more compact structure than the combination of the power supply unit and the further functional unit comprising an internal combustion engine.

In this case, the length of the combination of the power supply unit and a further functional unit designed to be operated using an internal combustion engine can be between approximately 4300 mm and approximately 5100 mm, for example approximately 4670 mm. Moreover, the length of the combination of the power supply unit and the further functional unit designed to be operated purely electrically can be between approximately 3100 mm and approximately 3900 mm, for example approximately 3520 mm. Furthermore, the length of the power supply unit according to the invention, alone, can be between approximately 1600 mm and approximately 2000 mm, for example approximately 1800 mm. Moreover, the length of the further functional unit designed to be operated using an internal combustion engine, alone, can be between approximately 2700 mm and approximately 3100 mm, for example approximately 2870 mm.

Advantageously, the electrics and/or software of the heavy road vehicle can be adapted depending on the combination of the power supply unit and the further functional unit.

According to a third aspect of the present invention, said invention relates to a heavy road vehicle comprising a combination according to the invention of a power supply unit according to the invention and a further functional unit.

In a development of the present invention, the at least one hydraulic drive motor of the heavy road vehicle can be a hydrostatic drive motor. The hydraulic pressure generated by the hydraulic pump assigned to the at least one hydraulic drive motor can thus be used to operate the drive motor.

Advantageously, at least one stay that connects the first connection elements of the power supply unit to the first mating connection elements of the heavy road vehicle and/or that connects the second connection elements of the power supply unit to the second mating connection elements of the further functional unit can be designed so as to be variable in length. As a result, the arrangement of the power supply unit and/or the further functional unit relative to the heavy road vehicle can be changed. This can be achieved hydraulically for example. It is thus possible to raise and/or tilt the power supply unit and/or the further functional unit relative to the heavy road vehicle, for example when driving over obstacles, in order to prevent the power supply unit from colliding with the obstacles.

Specifically in view of retrofitting existing heavy road vehicles that are already equipped with a further functional unit comprising an internal combustion engine, it can be advantageous for the first connection elements of the power supply unit to substantially match the second mating connection elements of the further functional unit, and for the second connection elements of the power supply unit to substantially match the first mating connection elements of the heavy road vehicle. A power supply unit can thus be provided that is compatible with the interface and can be retrofitted.

In a development of the heavy road vehicle, an upper periphery of the power supply unit and, if desired, also of the further functional unit, can be arranged no higher than the height of a load receiving surface of the heavy road vehicle. It can thus be ensured that for example the entire heavy road vehicle can be driven under a load to be received. On account of this development, the heavy road vehicle can also be driven under a load to be received when the power supply unit and the further functional unit are attached to the front of said vehicle, even if the passable space under the load is only slightly higher than the load receiving surface of the heavy road vehicle.

It should also be noted that the battery pack can comprise an interface to a supply mains. It is of course also conceivable to design the battery pack so as to be exchangeable or so as to be operable directly by mains current.

The invention will be explained in detail in the following on the basis of two embodiments and with reference to the accompanying drawings, in which.

Figure 1:
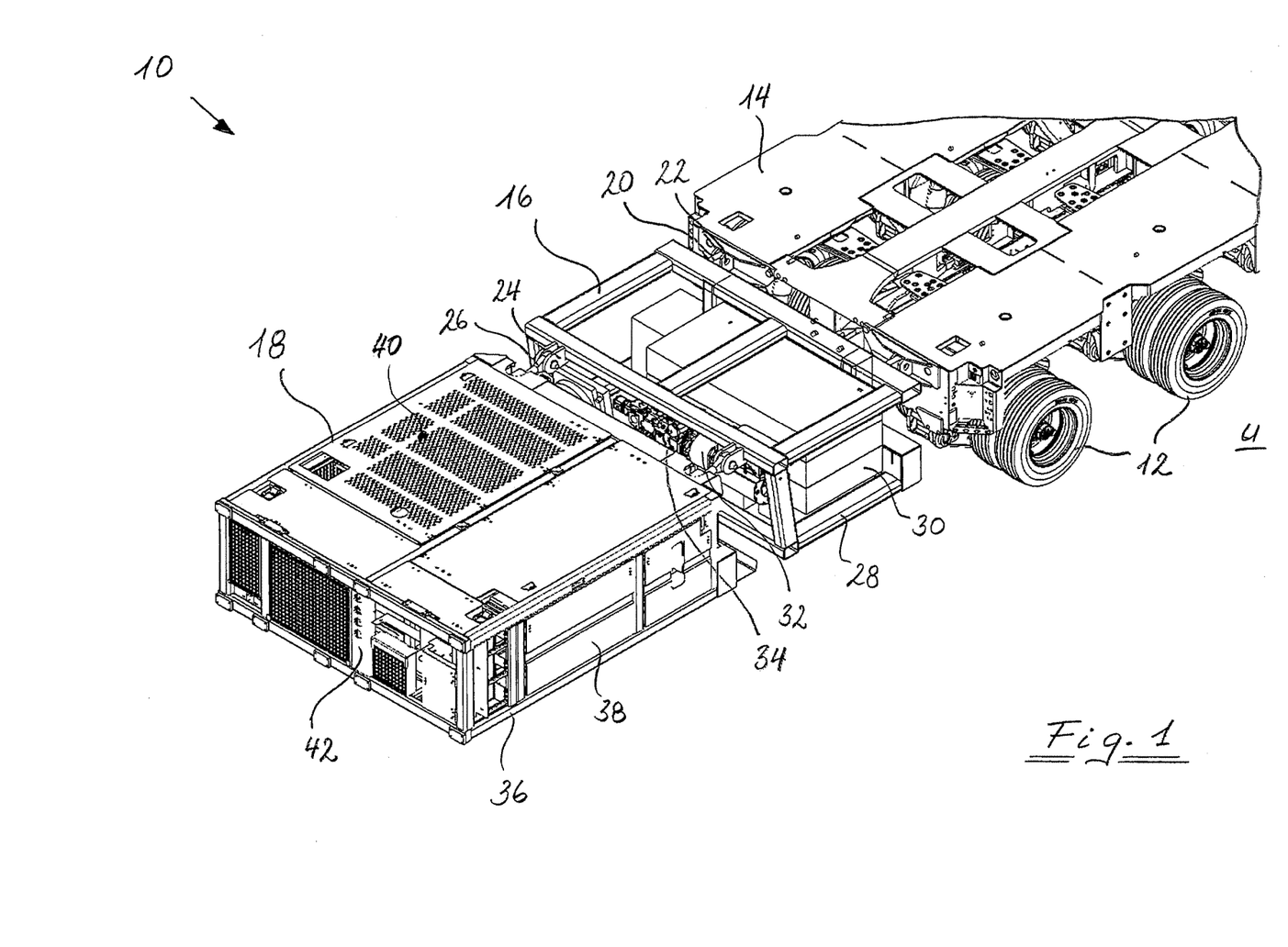
FIG. 1 is a perspective view of a combination of a power supply unit and a first embodiment of a further functional unit, specifically a further functional unit designed to be driven using an internal combustion engine, attached to a heavy road vehicle.

In FIG. 1, a heavy road vehicle is generally denoted by 10. Said vehicle comprises a chassis 14 that is supported on the ground U by wheel assemblies 12, a power supply unit 16 and a further functional unit 18. In technical language, the chassis 14 alone is also referred to as the "heavy road vehicle 10", since it is lacking only the units that provide the driving power. This language usage will also be applied in the following.

On the side thereof facing the heavy road vehicle 10, the power supply unit 16 comprises connection elements 20, by means of which the power supply unit 16 is connected to first mating connection elements 22 of the heavy road vehicle 10 (more precisely, of the chassis 14). On the side thereof remote from the heavy road vehicle 10, the power supply unit 16 comprises second connection elements 24, by means of which the power supply unit 16 is connected to second mating connection elements 26 of the further functional unit 18.

The power supply unit 16 comprises a frame 28, on which a battery pack 30, an electric motor 32 and a hydraulic pump 34 are arranged.

The further functional unit 18 comprises a frame 36, on which a hydraulic fluid reservoir 38, a diesel motor 40 and a user interface 42 are arranged.

The power supply unit 16 is also referred to as a "hybrid power pack" since, in combination with the further functional unit 18 that is also referred to as a "power pack" and that comprises a diesel motor, said power supply unit allows the heavy road vehicle 10 to be operated using an internal combustion engine (diesel operation D see FIG. 2), or to be operated purely using an electric motor (battery operation B see FIG. 2), as desired. A selector switch 44 (see FIG. 2) arranged on the hybrid power pack 16 makes it possible to switch between these two operating modes.

The interaction between the components of the hybrid power pack 16 and those of the conventional power pack 18 will be described with reference to the schematic circuit diagram in FIG. 2.

In the drive mode B using the electric motor, the battery pack 30 supplies the electric motor 32 with power so that the electric motor 32 can drive the hydraulic pump 34. The hydraulic pump 34 conveys hydraulic fluid, via a pumping and hydraulic line system 46 connected by a selector valve 48 to a drive hydraulic line system 50 of the heavy road vehicle 10, to the drive motors (not shown in the drawings) of the heavy road vehicle 10, which motors are arranged directly on the wheels of the wheel assemblies 12. In the event that there is insufficient hydraulic fluid in the hydraulic line systems 46 and 50, for example on account of leakages, in order to ensure correct operation of the drive motors of the heavy road vehicle 10 it is possible for the amount of hydraulic fluid that is lacking to be fed from the hydraulic fluid reservoir 38 to a connection 35 of the hydraulic pump 34 by means of a line 52. This advantageously occurs automatically.

In the drive mode D using the internal combustion engine, the diesel motor 40 drives a third hydraulic pump 54 that conveys hydraulic fluid via a hydraulic line system 56 to the selector valve 48. If the battery pack 30 is not fully charged, the selector valve 48 introduces the hydraulic fluid not only into the drive hydraulic line system 50 of the heavy road vehicle 10, but also into the pumping and hydraulic line system 46 where said fluid drives the hydraulic pump 34 as a hydraulic motor. If, in contrast, the battery pack 30 is fully charged, the selector valve 48 introduces the hydraulic fluid only into the drive hydraulic line system 50.

The state of charge of the battery pack 30 is detected by a state of charge sensor 58 and transmitted via a signal line 60 to a control unit 62 of the power supply unit 16, to which power supply unit the position of the switch 44 is also conveyed. The control unit 62 transmits a corresponding adjustment command to the selector valve 48 via a signal line (not shown here for the sake of greater clarity of the drawings).

If the hydraulic pump 34 is operated as a hydraulic motor in the drive mode using the internal combustion engine, as described above, said pump drives the electric motor 32 as an electric generator which thus generates a charging current by means of which the battery pack 30 can be recharged.

It should be noted at this point that the control unit 62 of the power supply unit 16 is connected to a central control unit 64 of the further functional unit 18. As already explained, the central control unit 64 is connected to an operating unit 42 (not shown in FIG. 2 for the sake of clarity). The only operating element provided on the power supply unit 16 is therefore the operating mode selector switch 44.

The two control units 62 and 64 are supplied with power by a 24 V on-board network 66. It can be seen that the control units 62 and 64 are connected to the earth terminal "−31" and to the positive terminal "+15". The positive terminal "+15" is the positive terminal that, in contrast with the positive terminal "+30", is supplied with power only when a main switch (not shown) of the heavy road vehicle 10 is activated.

In this connection, it is noted that, if the generator of the further functional unit 18 fails, the on-board network 66 can also be supplied with power from the battery pack 30. Since the batter pack 30 provides a voltage of 650 V, a DC/DC converter 68 is provided which is supplied with voltage via a circuit breaker 70 in this case. Under normal circumstances, the circuit breaker 70 connects the battery pack 30 to the electric motor 32, upstream of which power electronics 72 is arranged.

In order for it to be possible to prevent the battery pack 30 from overheating, said battery pack is provided with a cooling circuit 74 that comprises water, for example, as the coolant. In order to convey the water in the cooling circuit 74, a water pump 76 is provided in the cooling circuit, which pump conveys water from a water tank 78 to the battery pack 30, from where said water returns to the water tank 78 via a cooler 80. The heat emitted by the battery pack 30 and absorbed in the coolant can be emitted to the surroundings in the cooler 80.

Analogously to the cooling circuit 74 assigned to the battery pack 30, the electric motor 32 can comprise a cooling circuit 82 that comprises oil, for example, as the coolant. The cooling circuit 82 comprises an oil pump 84 that conveys oil from an oil tank 86 to the electric motor 32 in order to cool said motor. From the electric motor 32, the oil returns to the oil tank 86 via a cooler 88. The heat emitted by the electric motor 32 and absorbed in the coolant can be emitted to the surroundings in the cooler 88.

Both the electric motor 32 and the diesel motor 40 can be assigned further hydraulic pumps and/or compressors. Said pumps and/or compressors can advantageously be connected to the output shaft of the electric motor 32 and/or of the diesel motor 40. Here reference is made, merely by way of example, to the hydraulic pumps 90 and 92 that convey hydraulic fluid via a working hydraulic line system 94 to a lifting and/or steering system of the heavy road vehicle 10, hydraulic pumps 96 and 98 that convey hydraulic fluid to a hydraulic line system 100 for cross-flow scavenging of the drive motors of the heavy road vehicle 10, and compressors 102 and 104 that convey compressed air via a compressed air line system 106 to a compressed air tank (not shown) of the braking system of the heavy road vehicle 10. In principle, however, it is also conceivable to drive the compressors 102 and/or 104 using a separate electric and/or hydraulic motor.

Figure 4A:
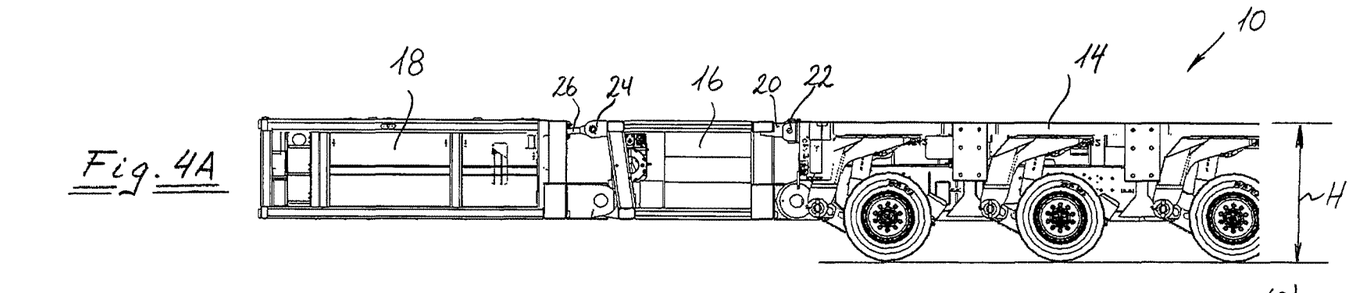
FIG. 4A to 4C are side views of the heavy road vehicle according to FIG. 1 (FIG. 4A), the heavy road vehicle according to FIG. 3 (FIG. 4B) and a heavy road vehicle according to the prior art (FIG. 4C).

With reference to FIG. 4A, it is noted that the heavy road vehicle 10, the power supply unit 16 and the further functional unit 18 are at a substantially uniform height H above the road.

Figure 2:
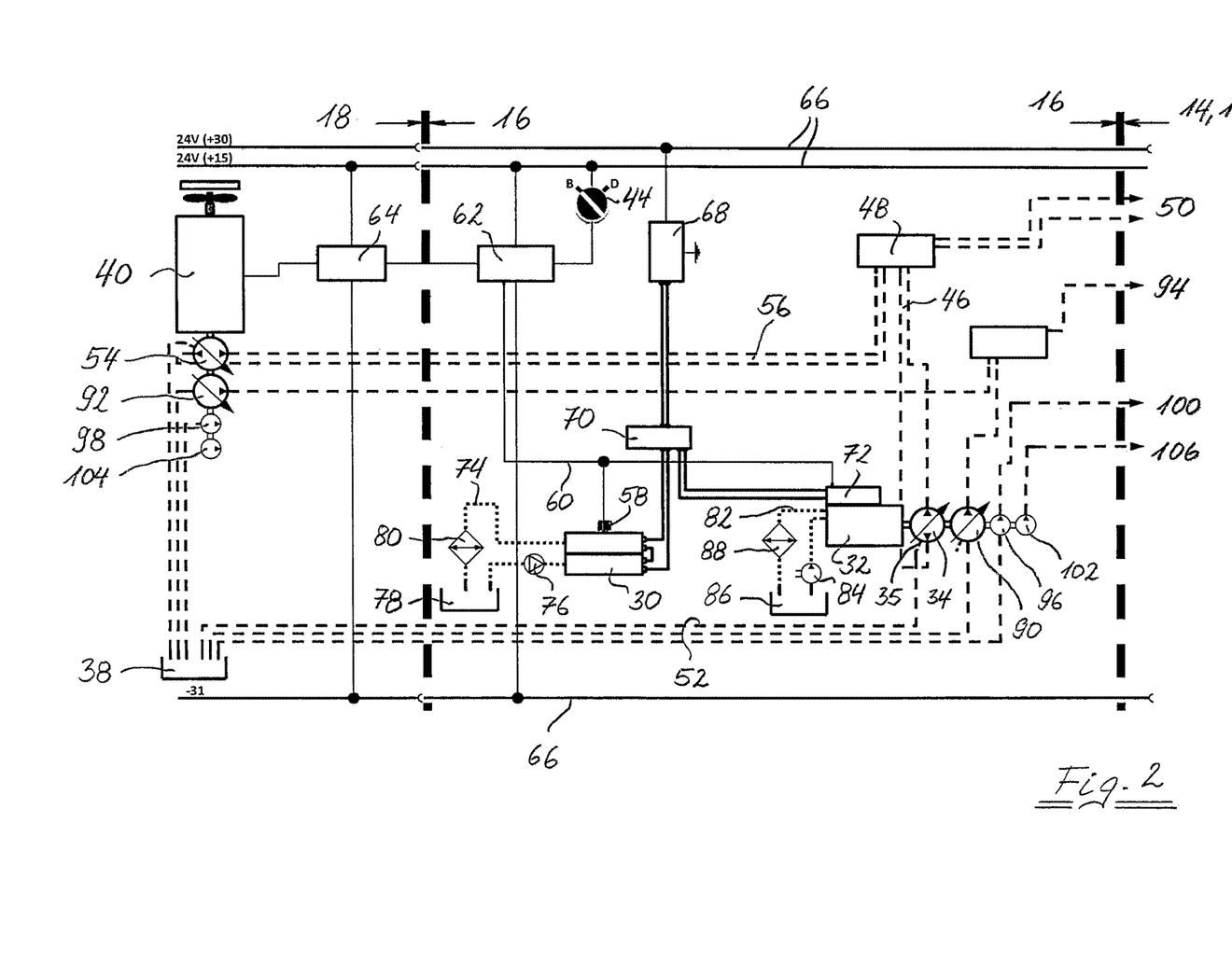
FIG. 2 is a schematic circuit diagram that shows interactions of operating components of the embodiment according to FIG. 1, by way of example.
Figure 3:
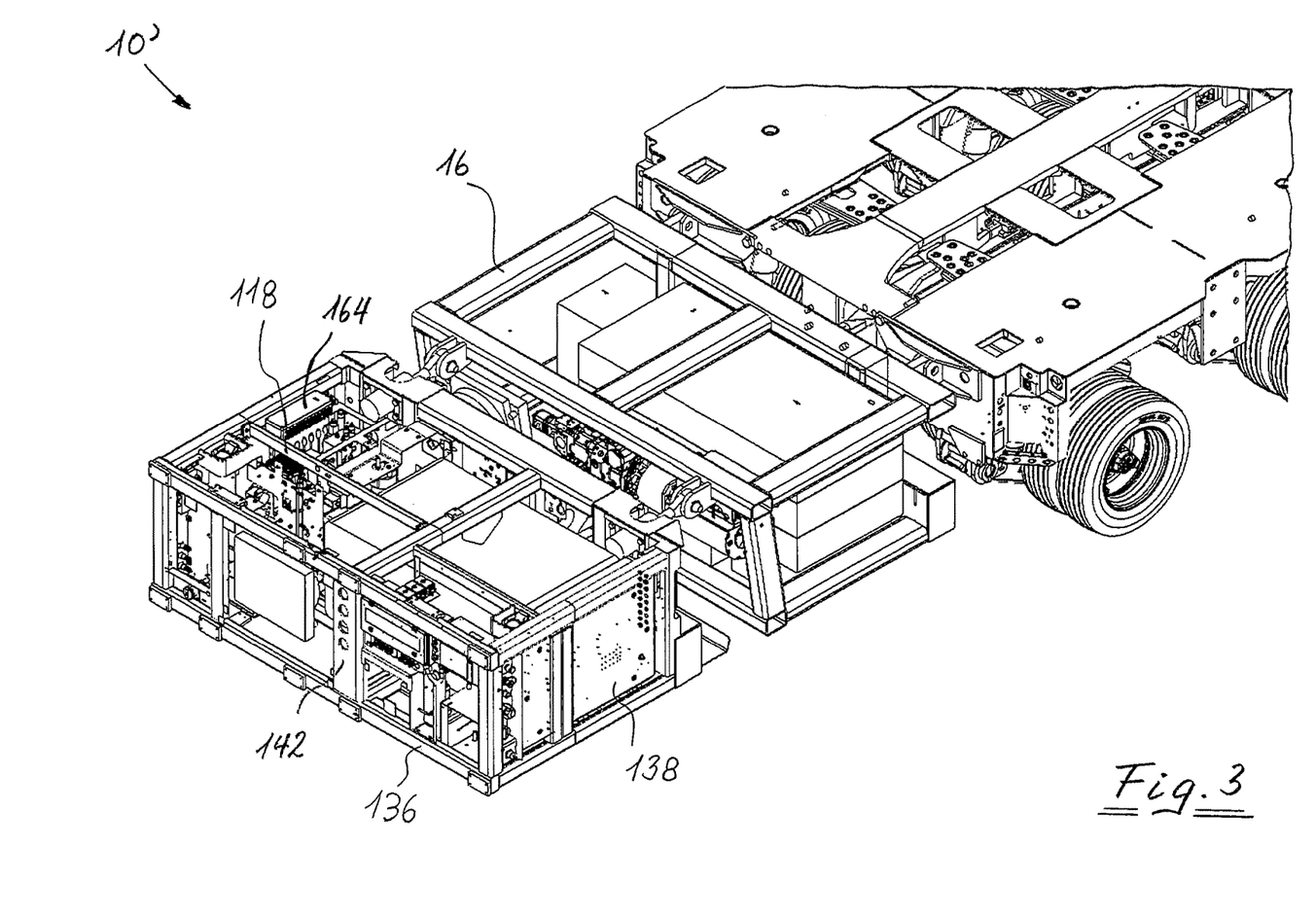
FIG. 3 is a perspective view of a combination of a power supply unit and a second embodiment of the further functional unit, specifically a further functional unit designed to be driven purely using an electric motor, attached to a heavy road vehicle.
Figure 4B:
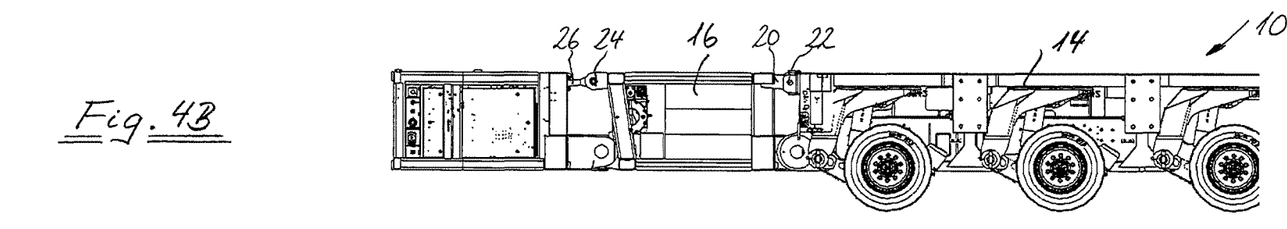

The embodiment in FIGS. 3 and 4B differs from that in FIGS. 1, 2 and 4A merely by the structure of the further functional unit. Specifically, instead of the functional unit 18 that provides an internal combustion engine drive mode, a functional unit 118 is provided that allows a purely electric motor drive mode. Therefore, the embodiment in FIGS. 3 and 4B will be described in the following only insofar as it differs from the embodiment according to FIGS. 1, 2 and 4A, to the description of which reference is otherwise explicitly made here.

The further functional unit 118 differs from the further functional unit 18 in particular in that it does not comprise a diesel motor 40 and therefore does not comprise the components connected thereto either. The further functional unit 118 can therefore comprise a shorter frame 136 in which in particular a hydraulic fluid reservoir 138, a controller 164 and an operating unit 142 are arranged in a space-optimised manner.

It should also be noted that the connection element/mating connection element combinations 20/22 and/or 24/26 can be designed so as to be variable in length in all the embodiments, and therefore the power supply unit 16 and/or the further functional unit 18 or 118 can be pivoted. As a result, it is possible for slopes to be descended without the power supply unit 16 and/or the further functional unit 18 or 118 colliding with the slope.

Figure 4C:
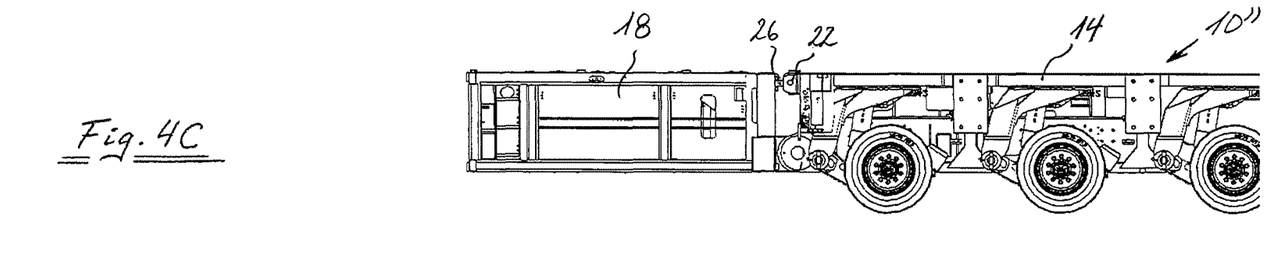

It should further be noted that a conventional heavy road vehicle 10" is shown in FIG. 4C, specifically a heavy load vehicle in which the chassis 14 is directly connected to the functional unit 18 that provides the drive mode using the internal combustion engine.

The invention claimed is:

1. A power supply unit that is designed for supplying at least one hydraulic drive motor of a heavy road vehicle with hydraulic fluid via a drive hydraulic line system of the heavy road vehicle comprising:
   a frame having first connection elements that cooperate with first mating connection elements of the heavy road vehicle in order to mechanically rigidly connect the power supply unit to the heavy road vehicle in an operational manner, and having second connection elements that cooperate with second mating connection elements of a further functional unit in order to mechanically rigidly connect the power supply unit to the further functional unit in an operational manner,
   a hydraulic pump that is fastened to the frame, driven by an associated electric motor and conveys hydraulic fluid to the drive hydraulic line system of the heavy road vehicle during operation, and
   a battery pack that is fastened to the frame and supplies electrical drive energy to the electric motor,
   wherein the hydraulic pump and the electric motor are designed such that the hydraulic pump can be operated as a hydraulic motor and the electric motor can be operated as an electric generator.

2. The power supply unit according to claim 1, wherein the hydraulic pump comprises a hydraulic connection, by means of which said pump can be fluidically connected to a hydraulic fluid reservoir arranged on the further functional unit.

3. The power supply unit according to claim 1, further comprising a tank for coolant for cooling the electric motor and a cooler for cooling the coolant for cooling the electric motor.

4. The power supply unit according to claims 1, further comprising a tank for coolant for cooling the battery pack and a cooler for cooling the coolant for cooling the battery pack.

5. The power supply unit according to claim 1, further comprising a second hydraulic pump that can also be driven by the electric motor and that is designed for conveying hydraulic fluid to a steering system and/or to a lifting system of the heavy road vehicle.

6. The power supply unit according to claim 5, wherein the second hydraulic pump comprises a hydraulic connection by means of which said second hydraulic pump can be fluidically connected to a hydraulic fluid reservoir arranged on the further functional unit.

7. The power supply unit according to claim 1, further comprising a compressor that is designed and for providing compressed air for a braking system of the heavy road vehicle.

8. A combination of a power supply unit according to claim 1, with a further functional unit comprising at least one hydraulic fluid reservoir.

9. The combination according to claim 8, wherein the further functional unit comprises an internal combustion engine and a third hydraulic pump, the internal combustion engine being connected to the third hydraulic pump so as to drive said third hydraulic pump, and the third hydraulic pump being designed for conveying hydraulic fluid to the drive hydraulic line system of the heavy road vehicle.

10. The combination according to claim 9, wherein the power supply unit comprises a controlled valve which, when the battery pack is fully charged, shuts off the one hydraulic pump and supplies the hydraulic fluid conveyed by the third hydraulic pump purely to the drive hydraulic line system of the heavy road vehicle.

11. The combination according to claim 8, wherein the further functional unit comprises a controller and/or a user interface.

12. A heavy road vehicle, comprising the power supply unit with a further functional unit according to claim 8.

13. The heavy road vehicle according to claim 12, wherein the at least one hydraulic drive motor is a hydrostatic drive motor.

14. The heavy road vehicle according to claim 12, wherein at least one stay that connects the first connection elements of the power supply unit to the first mating connection elements of the heavy road vehicle and/or that connects the second connection elements of the power supply unit to the second mating connection elements of the further functional unit is variable in length.

15. The heavy road vehicle according to claim 12, wherein an upper periphery of the power supply unit and also of the further functional unit is arranged no higher than the height of a load receiving surface of the heavy road vehicle.

* * * * *